US009841581B2

(12) United States Patent
Yoon et al.

(10) Patent No.: US 9,841,581 B2
(45) Date of Patent: Dec. 12, 2017

(54) PHOTOGRAPHIC LENS OPTICAL SYSTEM

(71) Applicant: KOLEN CO., LTD., Gyeonggi-do (KR)

(72) Inventors: Yong Gyu Yoon, Seoul (KR); Jong Jin Lee, Seoul (KR); Chan Goo Kang, Gyeonggi-do (KR)

(73) Assignee: KOLEN CO., LTD. (KR)

( * ) Notice: Subject to any disclaimer, the term of this patent is extended or adjusted under 35 U.S.C. 154(b) by 0 days.

(21) Appl. No.: 15/211,635

(22) Filed: Jul. 15, 2016

(65) Prior Publication Data

US 2017/0184812 A1    Jun. 29, 2017

(30) Foreign Application Priority Data

Dec. 23, 2015  (KR) .......................... 10-2015-0185106

(51) Int. Cl.
| | |
|---|---|
| *G02B 9/60* | (2006.01) |
| *G02B 5/00* | (2006.01) |
| *G02B 5/20* | (2006.01) |
| *G02B 1/04* | (2006.01) |
| *G02B 13/00* | (2006.01) |
| *B60R 1/00* | (2006.01) |

(52) U.S. Cl.
CPC ............... *G02B 9/60* (2013.01); *G02B 1/041* (2013.01); *G02B 5/005* (2013.01); *G02B 5/208* (2013.01); *G02B 13/0045* (2013.01); *B60R 1/00* (2013.01); *B60R 2300/10* (2013.01)

(58) Field of Classification Search
CPC ....................................................... G02B 9/60

USPC ........................................................... 359/770
See application file for complete search history.

(56) References Cited

U.S. PATENT DOCUMENTS

| | | | | |
|---|---|---|---|---|
| 7,679,832 | B1 * | 3/2010 | Wang ..................... | G02B 13/04 359/650 |
| 7,782,551 | B2 * | 8/2010 | Hsu ........................ | G02B 13/06 359/749 |
| 2006/0221457 | A1 * | 10/2006 | Murayama ............... | G02B 9/34 359/656 |
| 2011/0007404 | A1 | 1/2011 | Kim | |

(Continued)

FOREIGN PATENT DOCUMENTS

KR    10-2011-0004089 A    1/2011

*Primary Examiner* — Darryl J Collins
(74) *Attorney, Agent, or Firm* — Fitch Even Tabin & Flannery LLP

(57) ABSTRACT

A photographic lens optical system includes first to fifth lenses sequentially arranged in a direction away from an object. The first lens may have a negative refractive power, the second lens may have a positive or negative refractive power, the third lens may have a positive refractive power, the fifth lens may have a negative refractive power, and the fifth lens may have a positive refractive power. The first and fifth lenses may be spherical lenses. The fifth lens may be a biconvex lens. The second to fourth lenses may be aspherical lenses. An aperture stop may be between the second and third lenses. The photographic lens optical system may satisfy the inequality $-2.3 < f_{1G}/f < -1.3$, wherein $f_{1G}$ is the focal length of the first lens group including the first and second lenses, and f is the focal length of the photographic lens optical system.

16 Claims, 9 Drawing Sheets

(56) References Cited

U.S. PATENT DOCUMENTS

2012/0069140 A1* 3/2012 Tsai .................. G02B 13/0045
348/36

* cited by examiner

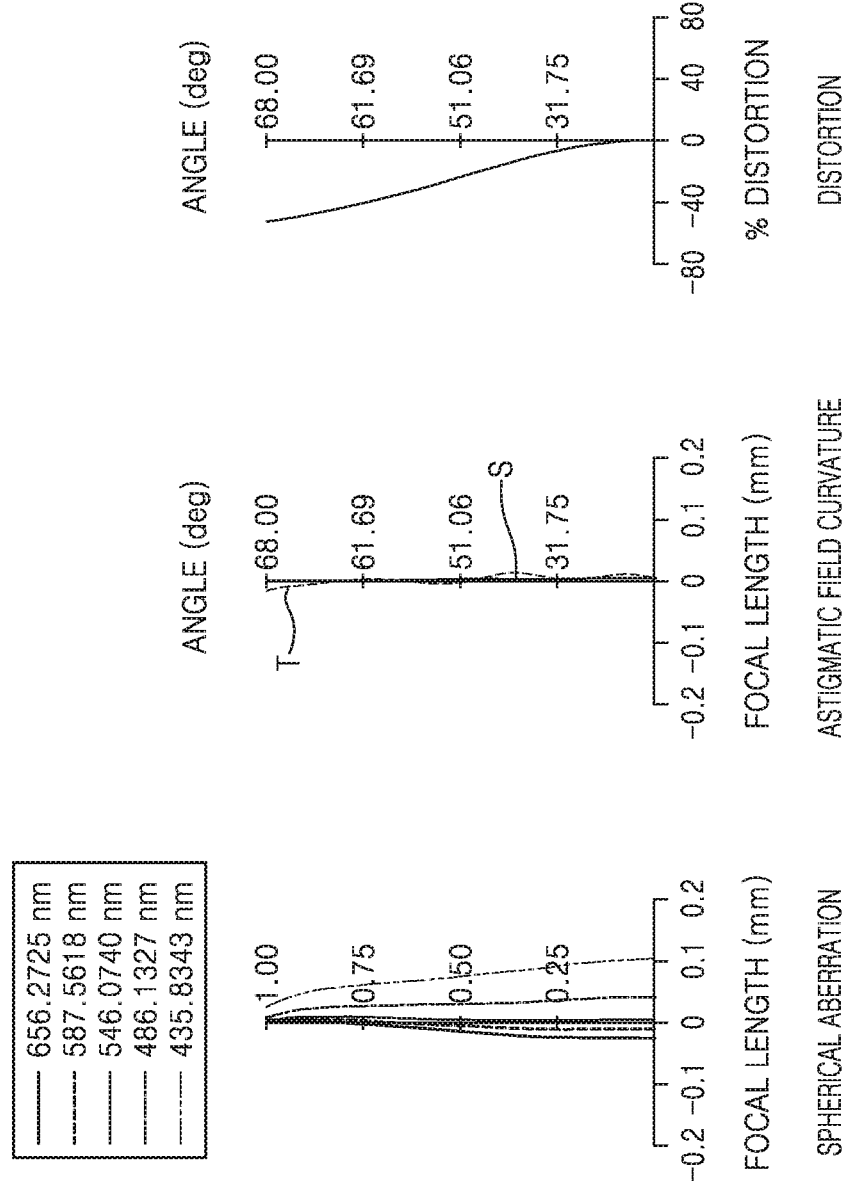

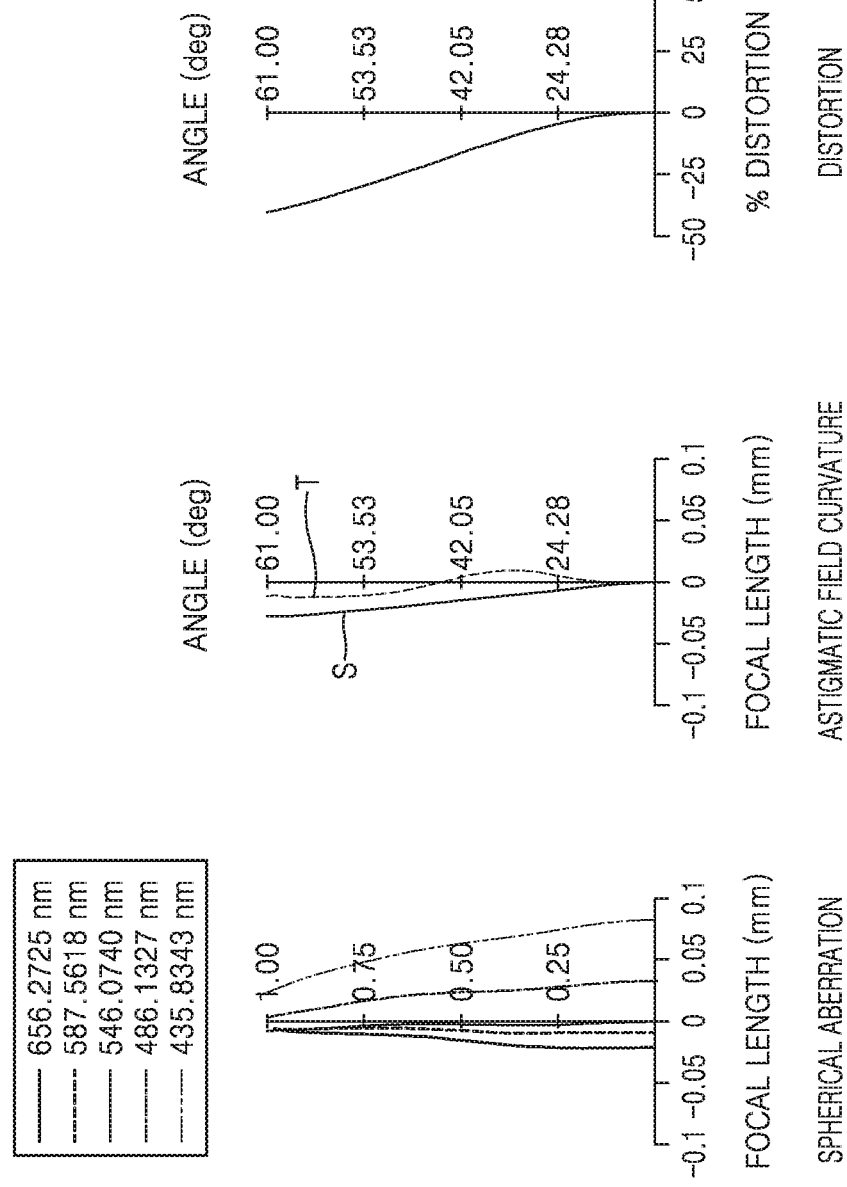

PHOTOGRAPHIC LENS OPTICAL SYSTEM

CROSS-REFERENCE TO RELATED APPLICATION

This application claims the benefit of Korean Patent Application No. 10-2015-0185106, filed on Dec. 23, 2015, in the Korean Intellectual Property Office, the disclosure of which is incorporated herein in its entirety by reference.

BACKGROUND

1. Field

One or more embodiments relate to an optical device, and more particularly, to a photographic lens optical system for cameras.

2. Description of the Related Art

Recently, the use and application of cameras including solid-state imaging devices such as complementary metal oxide semiconductor (CMOS) image sensors or charge coupled devices (CCDs) have greatly increased. Particularly, current high-performance/intelligent automobiles require cameras and optical systems for various purposes such as forward monitoring, backward monitoring, lane recognition, or autonomous driving.

Automotive cameras may include lens optical systems with a wide field of view (FOV) for wide-range monitoring. In addition, high-resolution/ultra-high-resolution cameras have been required to clearly recognize objects in addition to recognizing the shapes thereof. Furthermore, reliable/stable cameras capable of constant performance even under varying environmental conditions such as temperature variations are required. According to these requirements, the development of lens optical systems having a wide FOV (wide angle of view), high-performance/high-resolution/high-reliability, and characteristics suitable for size and weight reduction is required.

SUMMARY

One or more embodiments include a lens optical system suitable for size and weight reduction and having a wide field of view (FOV) and high performance.

One or more embodiments include a small, wide-FOV lens optical system having a focal length less affected by temperature.

Additional aspects will be set forth in part in the description which follows and, in part, will be apparent from the description, or may be learned by practice of the presented embodiments.

According to one or more embodiments, a lens optical system includes: a first lens having a negative (−) refractive power; a second lens having a positive (+) or negative (−) refractive power; an aperture stop; a third lens having a positive (+) refractive power; a fourth lens having a negative (−) refractive power; and a fifth lens having a positive (+) refractive power, wherein the first lens, the second lens, the aperture stop, the third lens, the fourth lens, and the fifth lens are sequentially arranged in a direction away from an object, the first and fifth lenses are spherical lenses, and the fifth lens is a biconvex lens.

The second lens, the third lens, and the fourth lens may be aspherical lenses.

The second lens, the third lens, and the fourth lens may be plastic lenses.

The lens optical system may satisfy at least one of Formulas 1 to 11:

$$-2.3 < f_{1G}/f < -1.3 \quad \text{Formula 1:}$$

wherein $f_{1G}$ is a focal length of a first lens group including the first and second lenses, and f refers to a focal length of the lens optical system, $$1.1 < f_3/f < 1.6 \quad \text{Formula 2:}$$

wherein $f_3$ is a focal length of the third lens, and f is a total focal length of the lens optical system, $$1.65 < Nd5 < 1.81 \quad \text{Formula 3:}$$

$$Vd5 > 45 \quad \text{Formula 4:}$$

where Nd5 is a refractive index of the fifth lens, and Vd5 is an Abbe number of the fifth lens, $$1.0 < |f_{2G}/f_{1G}| < 1.5 \quad \text{Formula 5:}$$

wherein $f_{1G}$ is a focal length of a first lens group including the first and second lenses, and $f_{2G}$ is a focal length of a second lens group including the third to fifth lenses, $$0.75 < f_{(2+3)}/f < 1.45 \quad \text{Formula 6:}$$

wherein $f_{(2+3)}$ is an effective focal length of the second and third lenses, and f is a focal length of the lens optical system, $$1.58 < D_{2G}/f_{2G} < 1.85 \quad \text{Formula 7:}$$

wherein $D_{2G}$ is a distance between an entrance surface of the third lens and an exit surface of the fifth lens, and $f_{2G}$ is a focal length of a second lens group including the third to fifth lenses, $$1.5 < f1/f_{1G} < 3.0$$

wherein f1 is a focal length of the first lens, and $f_{1G}$ is a focal length of a first lens group including the first and second lenses, $$2.2 < f_2/f_{1G} < 4.0 \quad \text{Formula 9:}$$

wherein $f_2$ is a focal length of the second lens, and $f_{1G}$ is a focal length of a first lens group including the first and second lenses, $$-0.85 < f_4/f_{2G} < -0.45 \quad \text{Formula 10:}$$

wherein $f_4$ is a focal length of the fourth lens, and $f_{2G}$ is a focal length of a second lens group including the third to fifth lenses, and $$2.5 < D_{(2+3)}/f_{(2+3)} < 7.0 \quad \text{Formula 11:}$$

wherein $D_{(2+3)}$ is a distance between an entrance surface of the second lens and an exit surface of the third lens, and $f_{(2+3)}$ is an effective focal length of the second and third lenses.

The first lens may have a meniscus shape convex toward the object.

The second lens may have a meniscus shape convex toward the object.

The third lens may be a biconvex lens.

The fourth lens may have an exit surface concave toward an image plane.

The lens optical system may have an FOV within a range of about 120° or greater.

According to one or more embodiments, a lens optical system includes: a first lens having a negative (−) refractive power, a meniscus shape convex toward an object, and spherical surfaces on both sides thereof; a second lens being an aspherical lens having a positive (+) or negative (−) refractive power and a meniscus shape convex toward the object; an aperture stop; a third lens being an aspherical biconvex lens having a positive (+) refractive power; a fourth lens being an aspherical lens having a negative (−) refractive power and an exit surface concave toward an image plane; and a fifth lens being a spherical biconvex lens having a positive (+) refractive power, wherein the first lens, the second lens, the aperture stop, the third lens, the fourth lens, and the fifth lens are sequentially arranged in a direction away from the object.

The lens optical system may satisfy at least one of Formula 1 to 11 described above.

At least one of the second lens, the third lens, and the fourth lens may be a plastic lens, and at least one of the first lens and the fifth lens may be a glass lens.

The lens optical system may have an FOV of about 120°.

BRIEF DESCRIPTION OF THE DRAWINGS

These and/or other aspects will become apparent and more readily appreciated from the following description of the embodiments, taken in conjunction with the accompanying drawings in which:

FIGS. 4A-4C illustrate a longitudinal spherical aberration, astigmatic field curvature, and distortion, respectively, of the lens optical system of the first embodiment;

FIGS. 6A-6C illustrate a longitudinal spherical aberration, astigmatic field curvature, and distortion, respectively, of the lens optical system of the third embodiment;

DETAILED DESCRIPTION

Figure 1:
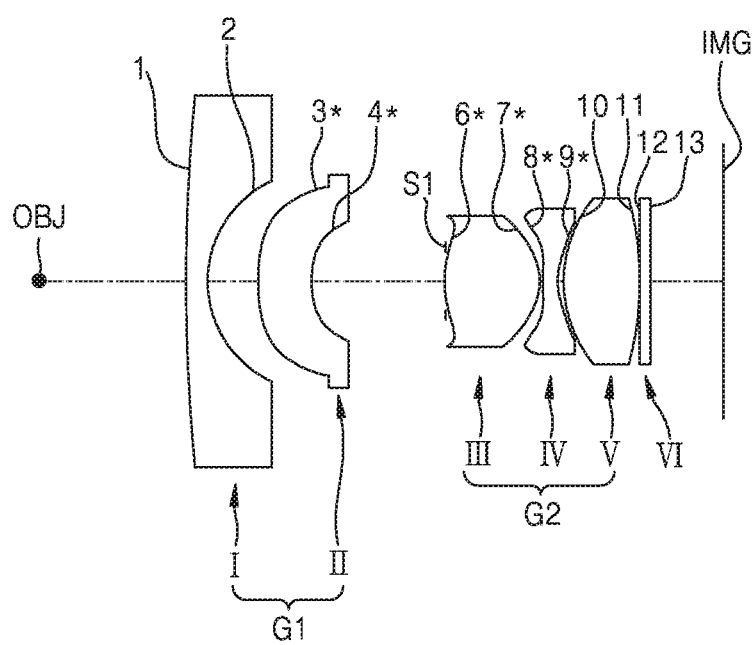
FIGS. 1 to 3 are cross-sectional views illustrating arrangements of main elements of lens optical systems according to first to third embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, lens optical systems will be described with reference to the accompanying drawings according to embodiments. In the drawings, like reference numerals refer to like (or similar) elements.

Figure 2:
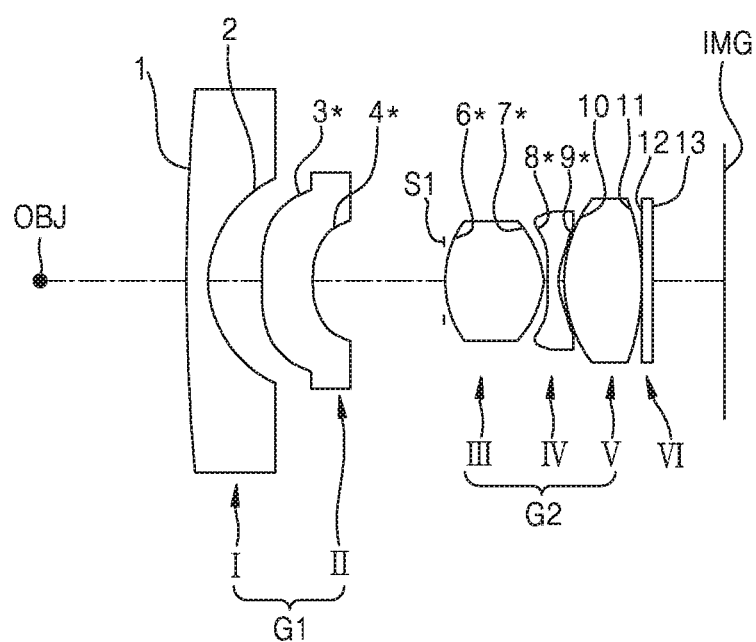
Figure 3:
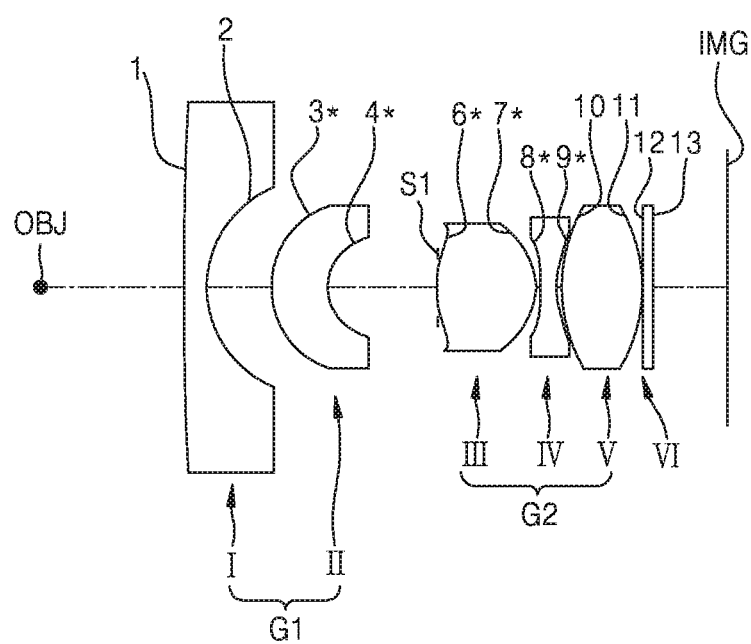

FIGS. 1 to 3 illustrate lens optical systems according to first to third embodiments.

Referring to FIGS. 1 to 3, each of the lens optical systems of the embodiments may include a first lens I, a second lens II, a third lens III, a fourth lens IV, and a fifth lens V that are sequentially arranged in a direction away from an object OBJ and toward an image sensor (image plane) IMG on which an image of the object OBJ is to be formed. The first lens I may have a negative (−) refractive power and a meniscus shape convex toward the object OBJ. The second lens II may have a positive (+) or negative (−) refractive power and a meniscus shape convex toward the object OBJ. In the embodiment shown in FIG. 2, a center portion (through which an optical axis passes) of an entrance surface 3* of the second lens II may be slightly concave toward the object OBJ. However, as a whole, the entrance surface 3* is convex toward the object OBJ. In the embodiment shown in FIG. 2, therefore, the second lens II may be mentioned as having a meniscus shape convex toward the object OBJ. In each of the embodiments shown in FIGS. 1 to 3, the entrance surface 3* and an exit surface 4* of the second lens II may be convex toward the object OBJ. The third lens III may have a positive (+) refractive power and may be convex on both entrance and exit surfaces 6* and 7* thereof. That is, the third lens III may be a biconvex lens. The fourth lens IV may have a negative (−) refractive power and an exit surface 9* concave toward the image sensor IMG. Although an entrance surface 8* of the fourth lens IV is approximately concave toward the object OBJ, a center portion (through which the optical axis passes) of the entrance surface 8* may be convex or concave toward the object OBJ. Therefore, a center portion of the fourth lens IV may be biconcave or convex toward the object OBJ. The fifth lens V may have a positive (+) refractive power and may be convex on both entrance and exit surfaces 10 and 11 thereof. That is, the fifth lens V may be a biconvex lens.

The first to fifth lenses I to V may be spherical lenses. An entrance surface 1 and an exit surface 2 of the first lens I may be spherical, and the entrance surface 10 and the exit surface 11 of the fifth lens V may be spherical. The first lens I and the fifth lens V may be glass lenses. The second lens II, the third lens III, and the fourth lens IV may be aspherical lenses. In other words, the entrance surfaces 3*, 6*, or 8* and the exit surfaces 4*, 7*, or 8* of the second lens II, the third lens III, and the fourth lens IV may be aspherical surfaces. The second lens II, the third lens III, and the fourth lens IV may include a plastic material. That is, the second lens II, the third lens III, and fourth lens IV may be plastic lenses. Among the five lenses I to V, the first lens I may have the largest outer diameter, and the third lens III may have the smallest outer diameter. The distance between the second lens II and the third lens III may be the largest, and the distance between the first lens I and the second lens II may be the second largest. The distances between the third to fifth lenses III to IV may be relatively very small.

An aperture stop S1 and an infrared blocking element VI may be arranged between the object OBJ and the image sensor IMG. The aperture stop S1 may be arranged between the second lens II and the third lens III. The aperture stop S1 may be closer to the third lens III than to the second lens II. The aperture stop S1 may be fixed. The first lens I and the second lens II arranged before the aperture stop S1 may be grouped in a first lens group G1, and the third to fifth lenses III to V arranged after the aperture stop S1 may be grouped in a second lens group G2. The infrared blocking element VI may be arranged between the fifth lens V and the image sensor IMG. The infrared blocking element VI may be an infrared blocking filter. A position and configuration of the infrared blocking element VI may vary.

Each of the lens optical systems of the embodiments may satisfy at least one of the following Formulas 1 to 11.

$$-2.3 < f_{1G}/f < -1.3 \quad \text{Formula 1:}$$

wherein $f_{1G}$ is the focal length of the first lens group G1 including the first lens I and the second lens II (that is, the effective focal length of the first lens I and the second lens II), and f is the total focal length of the lens optical system.

Formula 1 describes a relationship between the focal length $f_{1G}$ of the first lens group G1 and the total focal length f of the lens optical system. If $f_{1G}/f$ exceeds the upper limit, −1.3, the focal length $f_{1G}$ of the first lens group G1 is excessively short in a negative (−) direction and the exit surface 2 of the first lens I has a very small radius of curvature. Thus, it may be difficult to manufacture the lens optical system. In addition, if $f_{1G}/f$ exceeds the upper limit, −1.3, the second lens II may have a large negative (−) refractive power, and thus, the focal length of the lens optical system may considerably vary with the temperature of the plastic material. As a result, an image formation position may markedly vary with temperature, and thus, the performance of the lens optical system may decrease. On the other hand, if $f_{1G}/f$ is less than the lower limit, −2.3, the refractive power of the first lens group G1 may be very weak or the total focal length of the lens optical system may be shortened. If the refractive power of the first lens group G1 is weakened, the focal length $f_{1G}$ of the first lens group G1 is increased, and thus, the brightness of the lens optical system may be lowered. If the total focal length of the lens optical system is shortened, the refractive power of the second lens group G2 configured to condense light may increase, and thus, it may be difficult to manufacture the lens optical system.

$$1.1 < f_3/f < 1.6 \quad \text{Formula 2:}$$

wherein $f_3$ is the focal length of the third lens III, and f is the total focal length of the lens optical system.

Formula 2 describes conditions on the refractive power of the third lens III having a positive (+) refractive power. If $f_3/f$ exceeds the upper limit, 1.6, the refractive power of the third lens III decreases, and thus, the refractive power of the fifth lens V having a positive (+) refractive power may excessively increase. In this case, an astigmatic field curvature and a spherical aberration may increase, thereby making it difficult to ensure resolution balance. On the other hand, if $f_3/f$ is less than the lower limit, 1.1, the refractive power of the third lens III is excessively strong, and thus, it may be difficult to manufacture the third lens III.

$$1.65 < Nd5 < 1.81 \quad \text{Formula 3:}$$

$$Vd5 > 45 \quad \text{Formula 4:}$$

wherein Nd5 is the refractive index of the fifth lens V, and Vd5 is the Abbe number of the fifth lens V. The Abbe number is a measure of the material's dispersion.

Formulas 3 and 4 describe conditions on the material of the fifth lens V. Formulas 3 and 4 may indicate that the fifth lens V includes glass. If Nd5 of Formula 3 exceeds the upper limit, 1.81, the refractive index of the fifth lens V is excessively high, and thus, a coma aberration and astigmatic aberration may increase, thereby lowering resolution. On the other hand, if Nd5 of Formula 3 is less than the lower limit, 1.65, the refractive index of the fifth lens V is low, and thus, the radius of curvature of the fifth lens V is small. In this case, for example, the thickness of the fifth lens V may be increased in order to mass manufacture the fifth lens V. On the other hand, if Vd5 of Formula 4 is less than the lower limit, 45, a transverse chromatic aberration increases, thereby lowering resolution.

$$1.0 < |f_{2G}/f_{1G}| < 1.5 \quad \text{Formula 5:}$$

wherein $f_{1G}$ is the focal length of the first lens group G1 including the first lens I and the second lens II, and $f_{2G}$ is the focal length of the second lens group G2 including the third to fifth lenses III to V.

Formula 5 describes a relationship between the focal length of the first lens group G1 and the focal length of the second lens group G2, that is, a refractive power ratio of the second lens group G2 and the first lens group G1. If $|f_{2G}/f_{1G}|$ exceeds the upper limit, 1.5, the focal length of the first lens group G1 decreases or the focal length of the second lens group G2 increases. As a result, the total focal length and the total length of the lens optical system increase, and the brightness of the lens optical system decreases. On the other hand, if $|f_{2G}/f_{1G}|$ is less than the lower limit, 1.0, the refractive power of the lens optical system increases, and thus, it may be difficult to adjust aberrations of the lens optical system and thus guarantee the performance of the lens optical system.

$$0.75 < f_{(2+3)}/f < 1.45 \quad \text{Formula 6:}$$

wherein $f_{(2+3)}$ is the effective focal length of the second lens II and the third lens III, and f is the total focal length of the lens optical system.

Formula 6 describes how much the effective focal length of the second lens II and the third lens III has an effect on the total focal length of the lens optical system. If $f_{(2+3)}/f$ exceeds the upper limit, 1.45, the refractive power of the second lens II increases, or the refractive power of the third lens III decreases. As a result, the refractive power of the lens optical system decreases, thereby increasing an astigmatic field curvature and lowering the performance of the lens optical system. If $f_{(2+3)}/f$ is less than the lower limit, 0.75, the refractive power of the third lens III increases, thereby increasing the astigmatic aberration and astigmatic field curvature.

$$1.58 < D_{2G}/f_{2G} < 1.85 \quad \text{Formula 7:}$$

wherein $D_{2G}$ is the distance between the entrance surface 6* of the third lens III and the exit surface 11 of the fifth lens V (a distance along the optical axis). In other words, $D_{2G}$ may be the thickness of the second lens group G2 including the third to fifth lenses III to V. In addition, $f_{2G}$ is the focal length of the second lens group G2.

Formula 7 relates to the thickness of the second lens group G2. If $D_{2G}/f_{2G}$ exceeds the upper limit, 1.85, the thickness of the first lens group G1 is excessively large, thereby making it difficult to adjust the total length of the lens optical system or the focal length of the second lens group G2 decreases, thereby increasing a coma aberration and astigmatic aberration on the image plane. On the other hand, if $D_{2G}/f_{2G}$ is less than the lower limit, 1.58, the thickness of the second lens group G2 is excessively small, thereby lowering a productivity/mass productivity and increasing the manufacturing costs.

$$1.5 < f1/f_{1G} < 3.0 \quad \text{Formula 8:}$$

wherein f1 is the focal length of the first lens I, and $f_{1G}$ is the focal length of the first lens group G1 including the first lens I and the second lens II.

Formula 8 describes conditions on the refractive power of the first lens I relative to the refractive power of the first lens group G1. If $f1/f_{1G}$ exceeds the upper limit, 3.0, the refractive power of the first lens I decreases, and the refractive power of the second lens II increases. In this case, focal length variations increase with temperature variations, and thus it may be difficult to decrease the variation of the image formation position with temperature. If $f1/f_{1G}$ is less than the lower limit, 1.5, the refractive power of the first lens I increases and the refractive power of the first lens group G1 increases, thereby increasing the total focal length of the lens optical system. In this case, it may be difficult to decrease the total length of the lens optical system.

$$2.2 < f_2/f_{1G} < 4.0 \qquad \text{Formula 9:}$$

wherein $f_2$ is the focal length of the second lens II, and $f_{1G}$ is the focal length of the first lens group G1 including the first lens I and the second lens II.

Formula 9 describes a refractive power ratio of the first and second lenses I and II of the first lens group G1. If $f_2/f_{1G}$ exceeds the upper limit, 4.0, the refractive power of the second lens II markedly decreases or the refractive power of the first lens I increases. Thus, the refractive power of the first lens group G1 increases. In this case, a central optical performance position and a peripheral optimal performance position are separated two much, thereby lowering the performance of the lens optical system. If $f_2/f_{1G}$ is less than the lower limit, 2.2, the refractive power of the first lens group G1 decreases, and thus, the distance between the first lens group G1 and the second lens group G2 increases, thereby markedly decreasing the distance between the image plane (that is, the image sensor IMG) and the fifth lens V. As a result, the angle of light rays incident on the image plane (that is, the image sensor IMG) increases.

$$-0.85 < f_4/f_{2G} < -0.45 \qquad \text{Formula 10:}$$

wherein $f_4$ is the focal length of the fourth lens IV, and $f_{2G}$ is the focal length of the second lens group G2 including the third to fifth lenses III to V.

Formula 10 describes the refractive power of the fourth lens IV relative to the refractive power of the second lens group G2. If $f_4/f_{2G}$ exceeds the upper limit, −0.45, due to an excessively strong negative (−) refractive power, the back focal length of the lens optical system increases too much, and thus, the total length of the lens optical system increases. If $f_4/f_{2G}$ is less than the lower limit, −0.85, the image formation position may markedly vary with temperature, and thus it may be difficult to ensure that the lens optical system has a high degree of stability/reliability.

$$2.5 < D_{(2+3)}/f_{(2+3)} < 7.0 \qquad \text{Formula 11:}$$

wherein $D_{(2+3)}$ is the distance between the entrance surface 3* of the second lens II and the exit surface 7* of the third lens III (along the optical axis), and $f_{(2+3)}$ is the effective focal length of the second lens II and the third lens III.

Formula 11 describes the thicknesses of the second and third lenses II and III relative to the distance between the second and third lenses II and III. If $D_{(2+3)}/f_{(2+3)}$ exceeds the upper limit, 7.0, the distance between the second and third lenses II and III is excessively large, and thus, it may be difficult to provide a small/ultra-small optical system. If $D_{(2+3)}/f_{(2+3)}$ is less than the lower limit, 2.5, the distance between the second and third lenses II and III is excessively small. Thus, some of light rays passing through the aperture stop S1 may not be refracted by the third lens III, and the brightness of the lens optical system may decrease.

Table 1 below shows criteria of Formulas 1 to 11 set in the first to third embodiments.

TABLE 1

| No. | Criterion | First Embodiment | Second Embodiment | Third Embodiment |
|---|---|---|---|---|
| Formula 1 | $f_{1G}/f$ | −1.88 | −1.93 | −1.543 |
| Formula 2 | $f_3/f$ | 1.345 | 1.378 | 1.328 |
| Formula 3 | Nd5 | 1.7725 | 1.7725 | 1.697 |
| Formula 4 | Vd5 | 49.6 | 49.6 | 55.5 |
| Formula 5 | $|f_{2G}/f_{1G}|$ | −1.105 | −1.147 | −1.224 |
| Formula 6 | $f_{(2+3)}/f$ | 1.0628 | 0.9546 | 1.1988 |
| Formula 7 | $D_{2G}/f_{2G}$ | 4.7920 | 5.6401 | 3.5628 |
| Formula 8 | $f_1/f_{1G}$ | 1.8112 | 2.0328 | 2.4595 |
| Formula 9 | $f_2/f_{1G}$ | 3.5048 | 2.7715 | 2.9161 |
| Formula 10 | $f_4/f_{2G}$ | −0.5817 | −0.5429 | −0.7663 |
| Formula 11 | $D_{(2+3)}/f_{(2+3)}$ | 4.7919 | 5.6401 | 3.5628 |

Referring to Table 1, the lens optical systems of the first to third embodiments satisfy Formulas 1 to 11.

Table 2 below shows plastic materials that may be used in the embodiments. The refractive indexes and Abbe numbers of the plastic materials are shown with respect to temperature. For example, the plastic materials shown in Table 2 may be used to manufacture the second lens II, the third lens III, or the fourth lens IV.

TABLE 2

| Materials | −20° C. | | 20° C. | | 60° C. | |
|---|---|---|---|---|---|---|
| (Trademark) | RI | AN | RI | AN | RI | AN |
| Zenex 330R | 1.51423 | 57.3 | 1.50990 | 56.5 | 1.50560 | 57.4 |
| Osaka gas OKP1 | 1.64720 | 22.4 | 1.64250 | 22.5 | 1.63766 | 22.4 |
| Mitsui Apel 5514 | 1.54754 | 56.1 | 1.5441 | 56.1 | 1.54106 | 56.7 |
| Mitsubishi EP-7000 | 1.65560 | 21.5 | 1.651 | 21.5 | 1.6463 | 21.5 |
| F4520 | 1.5182 | 56.95 | 1.5123 | 56.30 | 1.5064 | 55.65 |

RI: Refractive Index,
AN: Abbe Number

Table 3 below shows the focal lengths and back focal lengths of the lens optical systems of the embodiments measured at some temperatures. In Table 3, the focal lengths and back focal lengths are given in millimeters (mm).

TABLE 3

| | −20° C. | | 20° C. | | 60° C. | |
|---|---|---|---|---|---|---|
| | f | BFL | f | BFL | f | BFL |
| First Embodiment | 1.5409 | 1.9940 | 1.54220 | 2.0000 | 1.5432 | 2.0056 |
| Second Embodiment | 1.4552 | 1.9769 | 1.4568 | 1.9818 | 1.4588 | 1.9879 |
| Third Embodiment | 1.6990 | 2.1934 | 1.7003 | 2.2000 | 1.7020 | 2.2079 | f: focal length,
BFL: Back Focal Length

In each of the lens optical systems of the embodiments, at least one aspherical lens may be used to improve the optical performance, and at least one plastic lens may be used to decrease the manufacturing costs. Compared to glass, the refractive index and dimensions of plastics vary greatly with temperature. Thus, two or more plastic lenses may be used. For example, three plastic lenses (that is, second to fourth lenses II to IV) may be used. In this case, the third lens III may have a strong positive (+) refractive power and the fourth lens IV may have a strong negative (−) refractive power so as to complementarily compensate for temperature-dependent variation of refractive power. In addition, a lack or surplus of the refractive powers of the third lens III and the fourth lens IV may be compensated for by the refractive power of the second lens II. Therefore, the second lens II may have a relatively weak positive (+) or negative (−) refractive power. In the case of an optical system having a wide field of view (FOV) and high brightness, aspherical lenses may be used so as to obtain a satisfactory performance. Thus, in the embodiments, the second to fourth lenses II to IV may be plastic lenses and aspherical surfaces may be formed on the second to fourth lenses II to IV to improve the performance of the lens optical systems. Furthermore, in each of the embodiments, glass lenses having surface hardness much greater than that of plastic lenses are used as outermost lenses so as to decrease damage (defects) such as scratches and easily remove/clean contaminants or stains. Therefore, the lens optical systems of the embodiments may have high performance, less temperature-dependent variation in the focal length, and high resistance to exterior damage, and it may be easy to clean and handle the lens optical systems.

The lens optical systems of the embodiments may have a wide FOV within the range of about 120° or greater. For example, the lens optical systems may have an FOV within the range of about 120° to about 140° (120°<θ<140°). In the above, θ refers to FOV. For example, the lens optical systems of the embodiments may be used as automotive optical systems.

Hereinafter, the first to third embodiments will be described with reference to lens data and the accompanying drawings.

Tables 4 to 6 below shows data such as the radii of curvature, thicknesses or intervals, refractive indexes, and Abbe numbers of the lenses of the lens optical systems shown in FIGS. 1 to 3. In Tables 4 to 6, R denotes a radius of curvature, D denotes the thicknesses of a lens, an interval between lenses, or an interval between adjacent elements, Nd denotes a refractive index of a lens measured using the d-line, and Vd denotes an Abbe number of a lens with respect to the d-line. The sign "*" next to a surface number indicates that the surface is aspherical. R and D are expressed in millimeters (mm). The data in Tables 4 to 6 was obtained at 20° C., which may be room temperature or a temperature close to room temperature.

TABLE 4

| First Embodiment | Surfaces | R | D | Nd | Vd |
|---|---|---|---|---|---|
| I | 1 | 59.2011 | 0.600 | 1.622994 | 58.12 |
|  | 2 | 3.1000 | 1.427 |  |  |
| II | 3* | 9.7705 | 1.483 | 1.5099 | 56.50 |
|  | 4* | 3.2208 | 3.216 |  |  |
|  | S1 | Infinity | 0.500 |  |  |
| III | 6* | 3.3549 | 2.655 | 1.5441 | 56.10 |
|  | 7* | −1.2331 | 0.100 |  |  |
| IV | 8* | 29.5852 | 0.400 | 1.6425 | 22.50 |
|  | 9* | 1.1560 | 0.150 |  |  |
| V | 10 | 3.6726 | 2.129 | 1.7725 | 49.62 |
|  | 11 | −8.9832 | 0.000 |  |  |
| VI | 12 | Infinity | 0.300 | 1.5168 | 64.17 |
|  | 13 | Infinity | 0.040 |  |  |
|  | IMG | Infinity | 2.000 |  |  |

TABLE 5

| Second Embodiment | Surfaces | R | D | Nd | Vd |
|---|---|---|---|---|---|
| I | 1 | 64.500 | 0.600 | 1.58913 | 61.25 |
|  | 2 | 3.200 | 1.525 |  |  |
| II | 3* | −39.728 | 1.405 | 1.50990 | 56.50 |
|  | 4* | 4.488 | 3.337 |  |  |
|  | S1 | Infinity | 0.350 |  |  |

TABLE 5-continued

| Second Embodiment | Surfaces | R | D | Nd | Vd |
|---|---|---|---|---|---|
| III | 6* | 3.188 | 2.750 | 1.54410 | 56.10 |
|  | 7* | −1.162 | 0.100 |  |  |
| IV | 8* | 22.179 | 0.300 | 1.65100 | 21.50 |
|  | 9* | 1.089 | 0.150 |  |  |
| V | 10 | 3.800 | 2.160 | 1.77250 | 49.62 |
|  | 11 | −7.000 | 0.000 |  |  |
| VI | 12 | Infinity | 0.300 | 1.5168 | 64.17 |
|  | 13 | Infinity | 0.040 |  |  |
|  | IMG | Infinity | 1.982 |  |  |

TABLE 6

| Third Embodiment | Surfaces | R | D | Nd | Vd |
|---|---|---|---|---|---|
| I | 1 | 185.6462 | 0.600 | 1.487489 | 48.75 |
|  | 2 | 3.1000 | 1.783 |  |  |
| II | 3* | 2.7690 | 1.500 | 1.51230 | 56.30 |
|  | 4* | 1.3258 | 2.569 |  |  |
|  | S1 | Infinity | 0.400 |  |  |
| III | 6* | 3.1695 | 2.693 | 1.54410 | 56.10 |
|  | 7* | −1.4139 | 0.100 |  |  |
| IV | 8* | −18.4610 | 0.450 | 1.65100 | 21.50 |
|  | 9* | 1.7925 | 0.125 |  |  |
| V | 10 | 4.6000 | 2.200 | 1.651599 | 58.40 |
|  | 11 | −4.6000 | 0.040 |  |  |
| VI | 12 | Infinity | 0.300 | 1.5168 | 64.17 |
|  | 13 | Infinity | 0.040 |  |  |
|  | IMG | Infinity | 2.200 |  |  |

The aperture ratio Fno, focal length f, and FOV (θ) of each of the lens optical systems of the first to third embodiments illustrated in FIGS. 1 to 3 are shown in Table 7 below. The focal length f is the total focal length of each lens optical system. The data in Tables 7 to 6 was obtained at 20° C.

TABLE 7

| Embodiments | Fno | f [mm] | FOV (θ) [°] |
|---|---|---|---|
| First Embodiment | 2.1 | 1.54 | 136 |
| Second Embodiment | 2.07 | 1.457 | 136 |
| Third Embodiment | 2.1 | 1.70 | 122 |

Fno: Aperture ratio, f: focal length, FOV: Field of View

As shown in Table 7, each of the lens optical systems of the embodiments has a wide FOV (θ) within the range of about 120° or greater, a focal length f of about 1.4 mm to about 1.7 mm, and an aperture ratio Fno of about 2.1 or less. If a lens optical system has a low aperture ratio Fno, a large amount of light may enter the lens optical system, and thus, the brightness of the lens optical system may be high.

Each of the aspherical surfaces of the lenses of the lens optical systems of the first to third embodiments satisfies the following aspherical surface equation:

<Aspherical Surface Equation>

$$x = \frac{c'y^2}{1 + \sqrt{1 - (K+1)c'^2 y^2}} + Ay^4 + By^6 + Cy^8 + Dy^{10} + Ey^{12}$$

wherein x denotes a distance measured from the vertex of a lens in the direction of the optical axis of the lens, y denotes a distance measured from the optical axis in a direction perpendicular to the optical axis, c' denotes the reciprocal (1/r) of the radius of curvature at the vertex of the lens, K denotes a conic constant, and A, B, C, D, and E denote aspherical surface coefficients.

Tables 8 to 10 below show aspherical surface coefficients of the lens optical systems of the first to third embodiments respectively illustrated in FIGS. 1 to 3. That is, Tables 8 to 10 show aspherical surface coefficients of the entrance surfaces 3*, 6*, and 8*, and the exit surfaces 4*, 7*, and 9* of the second to fourth lenses II to IV shown in Tables 4 to 6.

Figure 7:
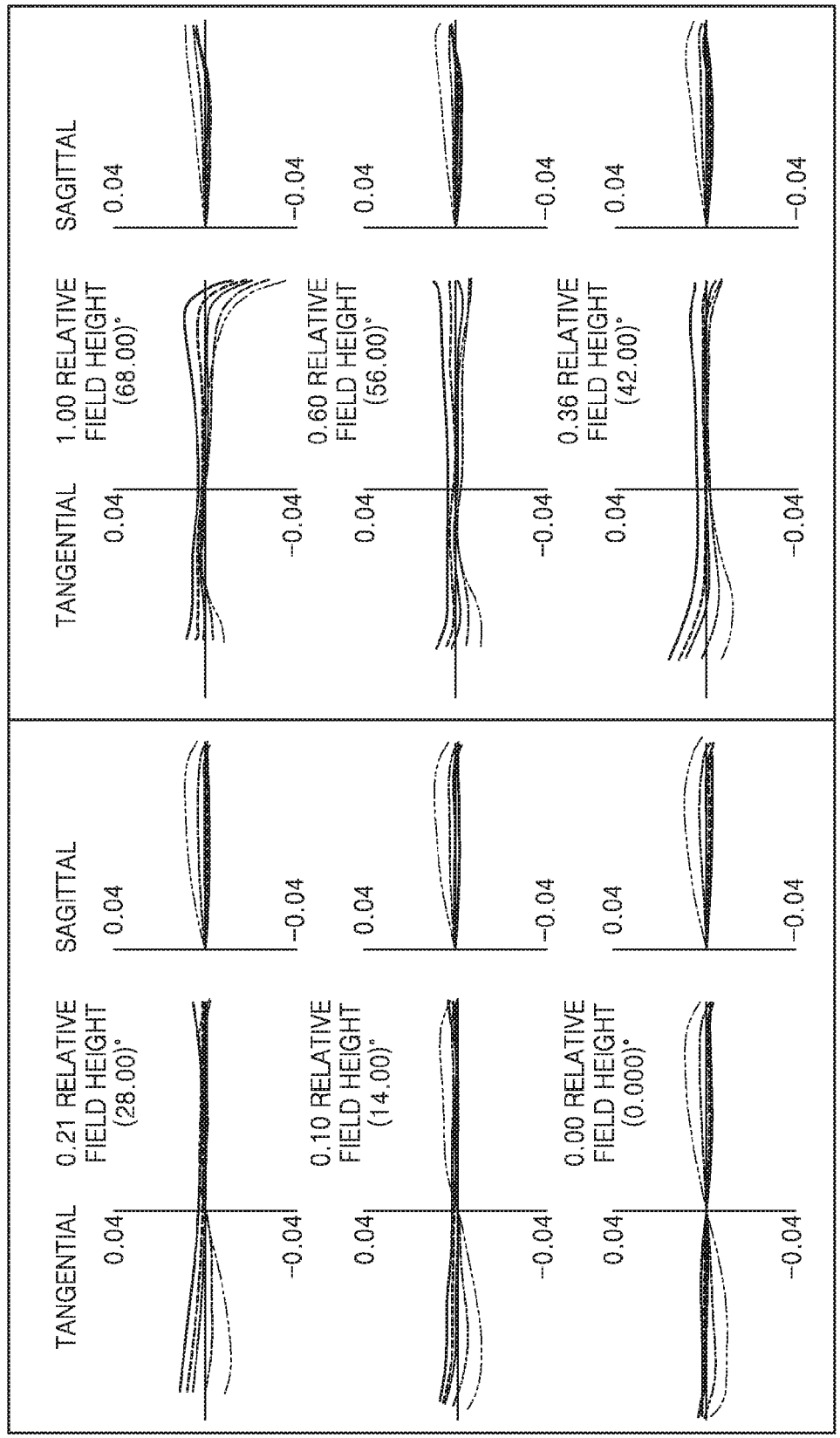
FIG. 7 illustrates a coma aberration of the lens optical system of the first embodiment according to relative field heights.

FIG. 7 is an aberration diagram illustrating a coma aberration of the lens optical system of the first embodiment (shown in FIG. 1) according to relative field heights.

Figure 8:
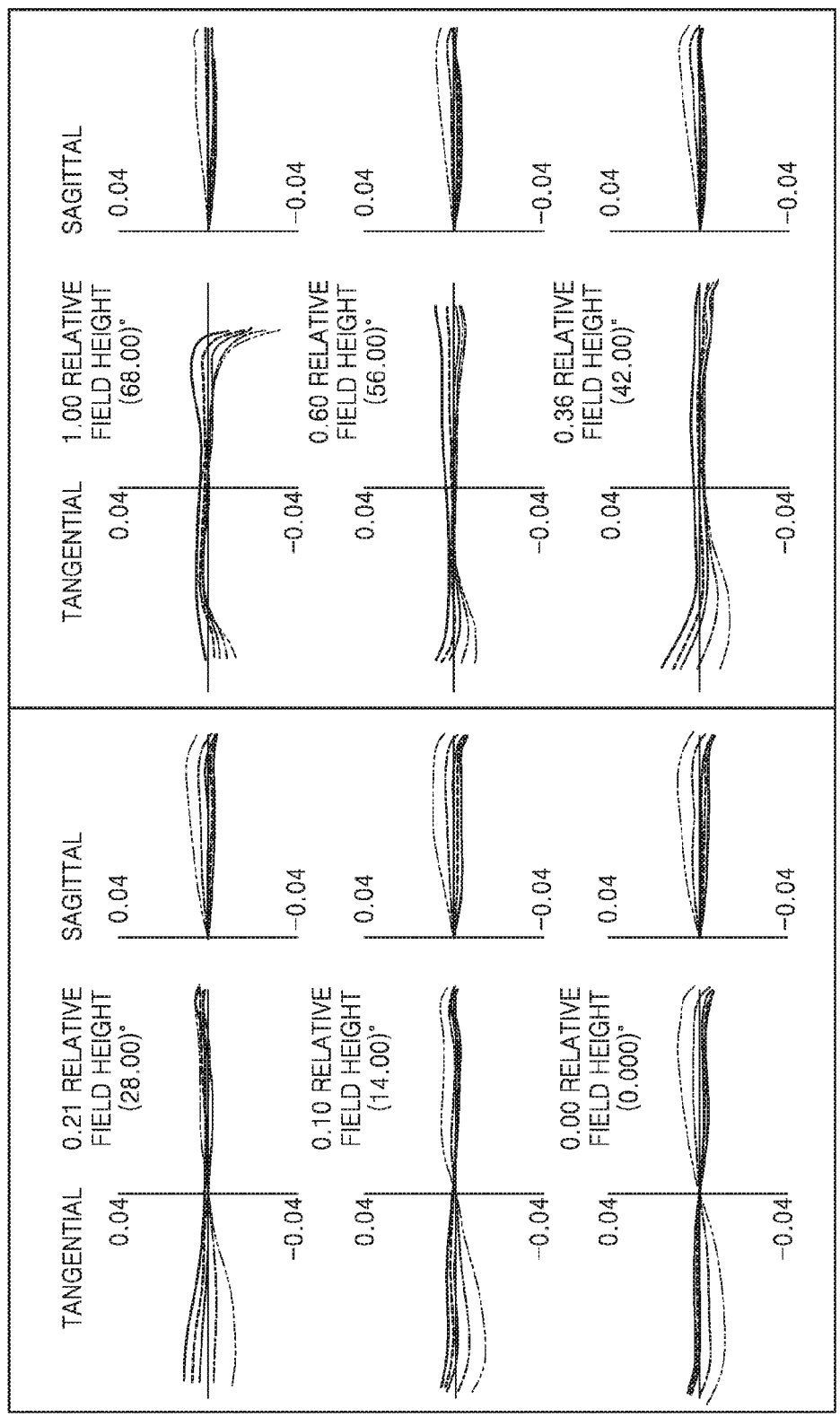
FIG. 8 illustrates a coma aberration of the lens optical system of the second embodiment according to relative field heights.

FIG. 8 is an aberration diagram illustrating a coma aberration of the lens optical system of the second embodiment (shown in FIG. 2) according to relative field heights.

Figure 9:
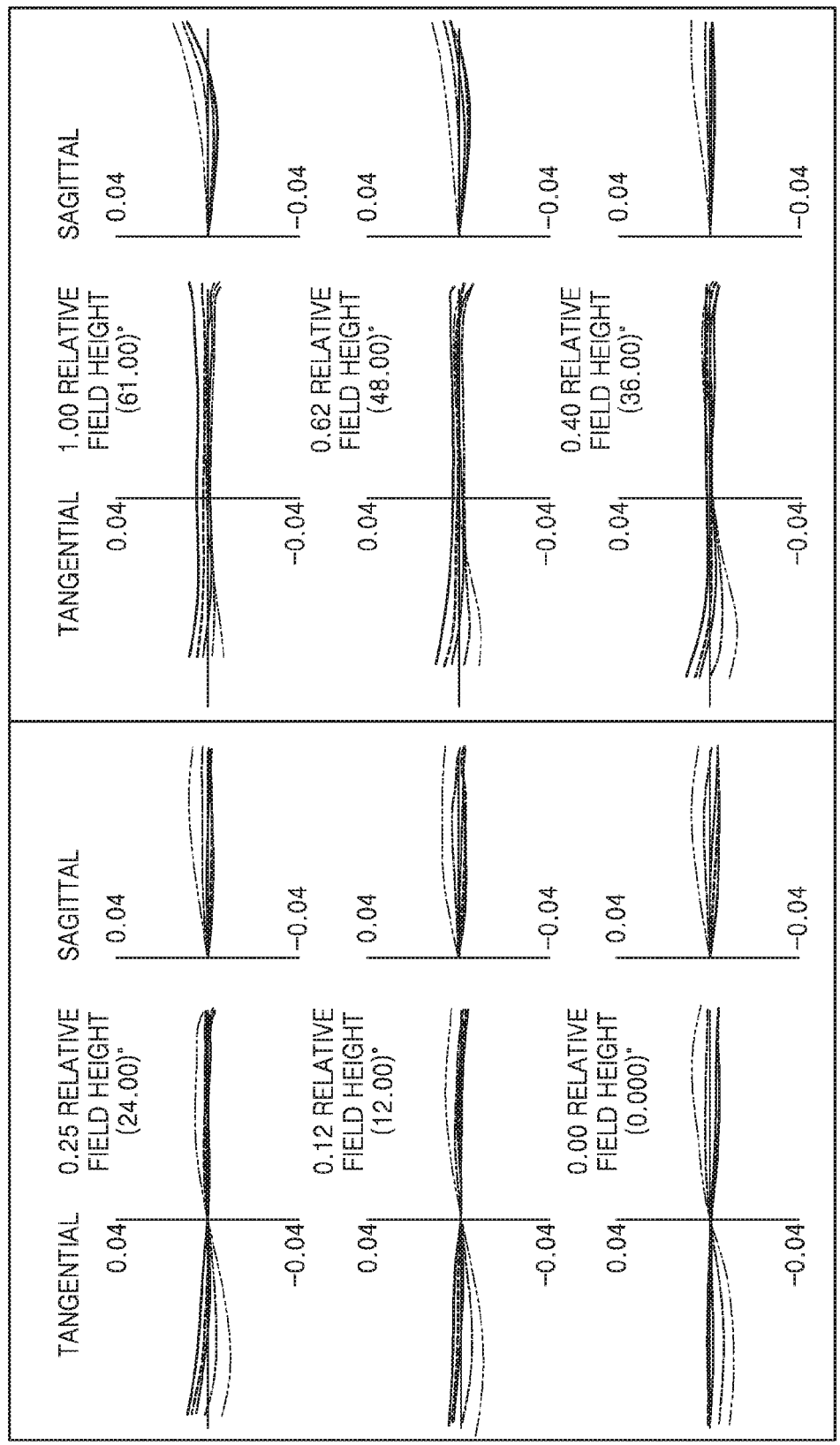
FIG. 9 illustrates a coma aberration of the lens optical system of the third embodiment according to relative field heights.

FIG. 9 is an aberration diagram illustrating a coma aberration of the lens optical system of the third embodiment (shown in FIG. 3) according to relative field heights.

TABLE 8

| Surfaces | K | A | B | C | D |
|---|---|---|---|---|---|
| 3* | 1.2386E+01 | 2.8996E−02 | −3.0818E−03 | 4.0087E−04 | — |
| 4* | −5.3029E−01 | 5.5534E−02 | −2.7758E−03 | 1.9170E−03 | 4.5883E−04 |
| 6* | −2.2667E−01 | −1.6172E−03 | −4.3020E−03 | 6.8924E−04 | −8.9211E−04 |
| 7* | −5.9759E+00 | −5.9550E−02 | 1.4737E−02 | −4.1508E−03 | 4.5170E−04 |
| 8* | 1.1000E+02 | −1.1360E−01 | 2.9640E−02 | −1.1529E−02 | 2.4842E−03 |
| 9* | −6.1389E+00 | −3.1010E−02 | 1.2549E−02 | −2.4223E−03 | 3.4742E−04 |

TABLE 9

| Surfaces | K | A | B | C | D |
|---|---|---|---|---|---|
| 3* | −266032 | 3.8034E−02 | −0.00401237 | 4.4898E−04 | — |
| 4* | −3.472332829 | 7.0620E−02 | −5.1622E−03 | 2.4905E−03 | 3.3815E−04 |
| 6* | 7.6086E−02 | −1.4516E−03 | 1.0809E−03 | −3.9852E−03 | 1.6950E−03 |
| 7* | −7.2799E+00 | −5.2119E−02 | 1.2587E−02 | −3.7234E−03 | 8.8435E−04 |
| 8* | 1.1000E+02 | −1.2005E−01 | 3.0743E−02 | −1.2417E−02 | 3.4237E−03 |
| 9* | −6.94357 | −0.03675 | 0.014447 | −0.00266 | 0.000409 |

TABLE 10

| Surfaces | K | A | B | C | D |
|---|---|---|---|---|---|
| 3* | 2.6999E−01 | 5.1735E−03 | −4.1674E−04 | 7.6970E−05 | — |
| 4* | −2.5714E−01 | 1.4806E−02 | −5.7422E−03 | 3.4191E−03 | −7.0159E−04 |
| 6* | −2.7906E−01 | −3.6668E−03 | −1.6107E−03 | −1.0345E−04 | −6.9825E−04 |
| 7* | −5.0382E+00 | −5.7998E−02 | 1.9996E−02 | −5.8880E−03 | 4.7117E−04 |
| 8* | 1.1000E+02 | −7.7070E−02 | 2.7988E−02 | −9.6702E−03 | 9.7138E−04 |
| 9* | −9.5709E+00 | −1.9865E−02 | 1.1913E−02 | −3.1643E−03 | 3.8457E−04 |

FIGS. 4A-4C illustrate a longitudinal spherical aberration, astigmatic field curvature, and distortion, respectively, of the lens optical system of the first embodiment (shown in FIG. 1) having the data shown in Table 4.

In FIG. 4A, the graph shows the spherical aberration of the lens optical system with respect to light having various wavelengths, and FIG. 4B the graph shows the astigmatic field curvature of the lens optical system including a tangential field curvature T and a sagittal field curvature S. Data of the FIG. 4A graph were obtained using light having wavelengths of 656.2725 nm, 587.5618 nm, 546.0740 nm, 486.1327 nm, and 435.8343 nm. Data of the graphs of FIGS. 4B and 4C were obtained using light having a wavelength of 546.0740 nm. Graphs of FIGS. 5A-5C and 6A-6C were obtained in the same manner.

Figures 5A, 5B, 5C:
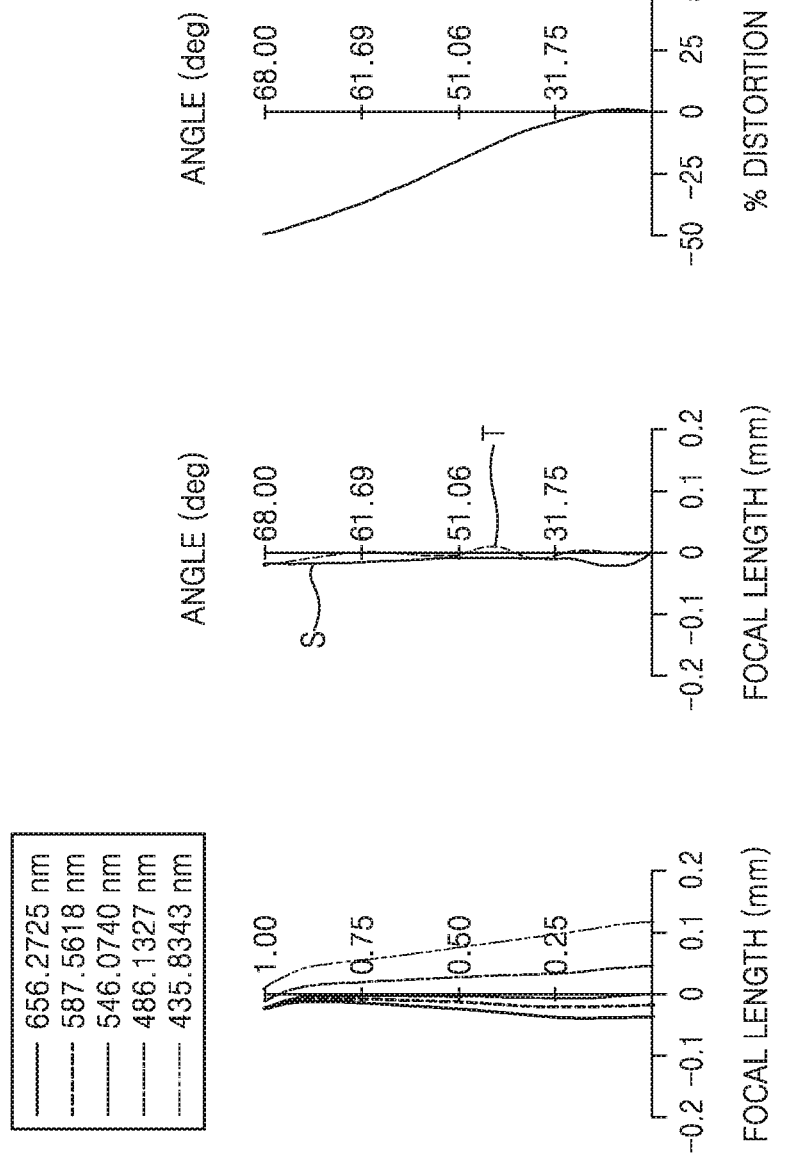
FIGS. 5A-5C illustrate a longitudinal spherical aberration, astigmatic field curvature, and distortion, respectively, of the lens optical system of the second embodiment.

The graphs of FIGS. 5A-5C illustrate a longitudinal spherical aberration, astigmatic field curvature, and distortion, respectively, of the lens optical system of the second embodiment (shown in FIG. 2) having the data shown in Table 5.

The graphs of FIGS. 6A-6C illustrate a longitudinal spherical aberration, astigmatic field curvature, and distortion, respectively, of the lens optical system of the second embodiment (shown in FIG. 3) having the data shown in Table 6.

As described above, according to the one or more of the above embodiments, the lens optical systems may have a wide FOV and high performance and may be suitable for size and weight reduction. In addition, the lens optical systems may have a small size and ultra-wide FOV, and characteristics of the lens optical systems such as a focal length may vary less with environmental variations such as a temperature variation. In the case of a lens optical system not having one of the designs proposed in the embodiments for compensating for temperature variation, the focal length of the lens optical system may considerably vary by about 20 μm to about 30 μm due to a temperature variation from room temperature (about 20° C.) to a low temperature of about −20° C. or a high temperature of about 60° C. to about 70° C., and thus, images having an intended degree of quality may not be obtained. However, according to the embodiments, such problems may not occur. In addition, according to the embodiments, glass lenses may be used as the first lenses and/or the last lenses of the lens optical systems so as to reduce exterior damage and easily clean and handle the lens optical systems.

The lens optical systems of the embodiments may be used as lens systems of automotive cameras. For example, the lens optical systems of the embodiments may be applied to various automotive devices such as black boxes, around view monitoring (AVM) systems, rear cameras, lane recognizing systems, or autonomous driving systems. Since the lens optical systems of the embodiments have compact structures and wide FOVs and easily correct aberrations, automotive devices employing the lens optical systems may have improved performance. In addition, characteristics, such as a focal length, of the lens optical systems of the embodiments do not easily vary with environmental variations such as a temperature variation, and thus, automotive devices employing the lens optical systems may have improved reliability/stability. The lens optical systems of the embodiments may be used in other various applications in addition to automotive devices.

It should be understood that the embodiments described herein should be considered in a descriptive sense only and not for purposes of limitation. Descriptions of features or aspects within each embodiment should typically be considered as available for other similar features or aspects in other embodiments. For example, those of ordinary skill in the art may use a blocking film as the infrared blocking element VI instead of using a filter. While one or more embodiments have been described with reference to the figures, it will be understood by those of ordinary skill in the art that various changes in form and details may be made therein without departing from the spirit and scope of the inventive concept as defined by the following claims.

What is claimed is:

1. A lens optical system comprising:
a first lens having a negative (−) refractive power;
a second lens having a positive (+) or negative (−) refractive power;
an aperture stop;
a third lens having a positive (+) refractive power;
a fourth lens having a negative (−) refractive power; and
a fifth lens having a positive (+) refractive power,
wherein the first lens, the second lens, the aperture stop, the third lens, the fourth lens, and the fifth lens are sequentially arranged in a direction away from an object, the first and fifth lenses are spherical lenses, and the fifth lens is a biconvex lens, and
wherein the lens optical system satisfies the following formula:

$$2.5 < D_{(2+3)}/f_{(2+3)} < 7.0$$

where $D_{(2+3)}$ is a distance between an entrance surface of the second lens and an exit surface of the third lens, and $f_{(2+3)}$ is an effective focal length of the second and third lenses.

2. The lens optical system of claim 1, wherein the second lens, the third lens, and the fourth lens are aspherical lenses.

3. The lens optical system of claim 1, wherein the second lens, the third lens, and the fourth lens are plastic lenses.

4. The lens optical system of claim 1, wherein the lens optical system satisfies Formula 1 below:

$$-2.3 < f_{1G}/f < -1.3 \qquad \text{Formula 1}$$

wherein $f_{1G}$ is a focal length of a first lens group comprising the first and second lenses, and f is a focal length of the lens optical system.

5. The lens optical system of claim 1, wherein the lens optical system satisfies Formula 2 below:

$$1.1 < f_3/f < 1.6 \qquad \text{Formula 2}$$

wherein $f_3$ is a focal length of the third lens, and f is a total focal length of the lens optical system.

6. The lens optical system of claim 1, wherein the lens optical system satisfies Formulas 3 and 4 below:

$$1.65 < Nd5 < 1.81 \qquad \text{Formula 3}$$

$$Vd5 > 45 \qquad \text{Formula 4}$$

wherein Nd5 is a refractive index of the fifth lens, and Vd5 is an Abbe number of the fifth lens.

7. The lens optical system of claim 1, wherein the lens optical system satisfies Formula 5 below:

$$1.0 < |f_{2G}/f_{1G}| < 1.5 \qquad \text{Formula 5}$$

wherein $f_{1G}$ is a focal length of a first lens group comprising the first and second lenses, and $f_{2G}$ is a focal length of a second lens group comprising the third to fifth lenses.

8. The lens optical system of claim 1, wherein the lens optical system satisfies Formula 6 below:

$$0.75 < f_{(2+3)}/f < 1.45 \qquad \text{Formula 6}$$

wherein $f_{(2+3)}$ is an effective focal length of the second and third lenses, and f is a focal length of the lens optical system.

9. The lens optical system of claim 1, wherein the lens optical system satisfies Formula 7 below:

$$1.58 D_{2G}/f_{2G} < 1.85 \qquad \text{Formula 7}$$

wherein $D_{2G}$ is a distance between an entrance surface of the third lens and an exit surface of the fifth lens, and $f_{2G}$ is a focal length of a second lens group comprising the third to fifth lenses.

10. The lens optical system of claim 1, wherein the lens optical system satisfies Formula 8 below:

$$1.5 < f1/f_{1G} < 3.0 \qquad \text{Formula 8}$$

wherein f1 is a focal length of the first lens, and $f_{1G}$ is a focal length of a first lens group comprising the first and second lenses.

11. The lens optical system of claim 1, wherein the lens optical system satisfies Formula 9 below:

$$2.2 < f_2/f_{1G} < 4.0 \qquad \text{Formula 9}$$

wherein fa is a focal length of the second lens, and $f_{1G}$ is a focal length of a first lens group comprising the first and second lenses.

12. The lens optical system of claim 1, wherein the lens optical system satisfies Formula 10 below:

$$-0.85 < f_4/f_{2G} < -0.45 \qquad \text{Formula 10}$$

wherein $f_4$ is a focal length of the fourth lens, and $f_{2G}$ is a focal length of a second lens group comprising the third to fifth lenses.

13. The lens optical system of claim 1, wherein the first lens has a meniscus shape convex toward the object,
the second lens has a meniscus shape convex toward the object,
the third lens is a biconvex lens, and
the fourth lens has an exit surface concave toward an image plane.

14. The lens optical system of claim 1, wherein the lens optical system has a field of view (FOV) within a range of about 120° or greater.

15. A lens optical system comprising:
a first lens having a negative (−) refractive power, a meniscus shape convex toward an object, and spherical surfaces on both sides thereof;
a second lens being an aspherical lens having a positive (+) or negative (−) refractive power and a meniscus shape convex toward the object; an aperture stop;
a third lens being an aspherical biconvex lens having a positive (+) refractive power;

a fourth lens being an aspherical lens having a negative (−) refractive power and an exit surface concave toward an image plane; and a fifth lens being a spherical biconvex lens having a positive (+) refractive power, wherein the first lens, the second lens, the aperture stop, the third lens, the fourth lens, and the fifth lens are sequentially arranged in a direction away from the object, and wherein the lens optical system satisfies at least one of the following formulas:

$-2.3 < f_{1G}/f < -1.3$ $1.0 < |f_{2G}/f| < 1.5$ $0.75 < f_{(2+3)}/f < 1.45$ $1.58 < D_{2G}/f_{2G} < 1.85$ $2.5 < D_{(2+3)}/f_{(2+3)} < 7.0$ wherein $f_{1G}$ is a focal length of a first lens group comprising the first and second lenses, f is a focal length of the lens optical system, $f_{2G}$ is a focal length of a second lens group comprising the third to fifth lenses, $f_{(2+3)}$ is an effective focal length of the second and third lenses, $D_{2G}$ is a distance between an entrance surface of the third lens and an exit surface of the fifth lens, and $D_{(2+3)}$ is a distance between an entrance surface of the second lens and an exit surface of the third lens.

16. A lens optical system comprising:

a first lens having a negative (−) refractive power;

a second lens having a positive (+) or negative (−) refractive power;

an aperture stop;

a third lens having a positive (+) refractive power;

a fourth lens having a negative (−) refractive power; and a fifth lens having a positive (+) refractive power, wherein the first lens, the second lens, the aperture stop, the third lens, the fourth lens, and the fifth lens are sequentially arranged in a direction away from an object, the first and fifth lenses are spherical lenses, and the fifth lens is a biconvex lens, and wherein the lens optical system satisfies the following formula:

$1.58 < D_{2G}/f_{2G} < 1.85$ wherein $D_{2G}$ is a distance between an entrance surface of the third lens and an exit surface of the fifth lens, and $f_{2G}$ is a focal length of a second lens group comprising the third to fifth lenses.

* * * * *

UNITED STATES PATENT AND TRADEMARK OFFICE
CERTIFICATE OF CORRECTION

PATENT NO. : 9,841,581 B2
APPLICATION NO. : 15/211635
DATED : December 12, 2017
INVENTOR(S) : Yong Gyu Yoon, Jong Jin Lee and Chan Goo Kang It is certified that error appears in the above-identified patent and that said Letters Patent is hereby corrected as shown below:

In the Claims

Claim 9, Column 14, Line 23, delete "1.58D2G/" and insert -- 1.58<D2G/ --.
Claim 11, Column 14, Line 39, delete "fa" and insert -- f2 --.
Claim 15, Column 15, Line 15, delete "|f2G/|" and insert -- |f2G/f1G| --.

Signed and Sealed this
Fifth Day of June, 2018

Andrei Iancu
*Director of the United States Patent and Trademark Office*